(12) United States Patent
Hobmeyr et al.

(10) Patent No.: US 8,007,948 B2
(45) Date of Patent: Aug. 30, 2011

(54) ION EXCHANGE CARTRIDGE FOR FUEL CELL APPLICATIONS

(75) Inventors: Ralph T. J. Hobmeyr, Mainz-Kastel (DE); Marlene Rinner, Tramin (IT); Mario Naretto Rosso, Settimo T.se Turin (IT)

(73) Assignee: GM Global Technology Operations LLC, Detroit, MI (US)

( * ) Notice: Subject to any disclaimer, the term of this patent is extended or adjusted under 35 U.S.C. 154(b) by 657 days.

(21) Appl. No.: 12/048,240

(22) Filed: Mar. 14, 2008

(65) Prior Publication Data

US 2009/0233134 A1     Sep. 17, 2009

(51) Int. Cl.
*H01M 8/04*   (2006.01)
*B01D 24/02*  (2006.01)

(52) U.S. Cl. .................. 429/433; 429/512; 210/282
(58) Field of Classification Search .................. 429/433, 429/512; 210/282
See application file for complete search history.

(56) References Cited

U.S. PATENT DOCUMENTS

| 4,477,347 | A | * | 10/1984 | Sylva ........................... 210/232 |
| 5,154,823 | A | * | 10/1992 | Ma et al. ...................... 210/232 |
| 5,395,509 | A | * | 3/1995 | Guerra Cisneros et al. .. 210/282 X |
| 5,744,030 | A | * | 4/1998 | Reid et al. ................. 210/282 X |
| 5,983,938 | A | * | 11/1999 | Bowers et al. ............ 210/282 X |
| 2005/0115884 | A1 | | 6/2005 | Suzuki et al. |

FOREIGN PATENT DOCUMENTS

| JP | 2001035519 A | | 1/2009 |
| JP | 2001-35519 | * | 9/2010 |

* cited by examiner

*Primary Examiner* — Stephen J. Kalafut
(74) *Attorney, Agent, or Firm* — Fraser Clemens Martin & Miller LLC; J. Douglas Miller

(57) ABSTRACT

An ion exchange cartridge for a coolant system of a fuel cell stack is provided. The ion exchange cartridge includes a housing with an ion exchange resin disposed therein. The housing includes an inlet and at least one fluid-permeable outlet window configured for coolant to flow therethrough. The ion exchange cartridge is adapted to be removably disposed in the coolant system. An ion exchange cartridge assembly and a coolant tank assembly having the ion exchange cartridge are also provided.

17 Claims, 5 Drawing Sheets

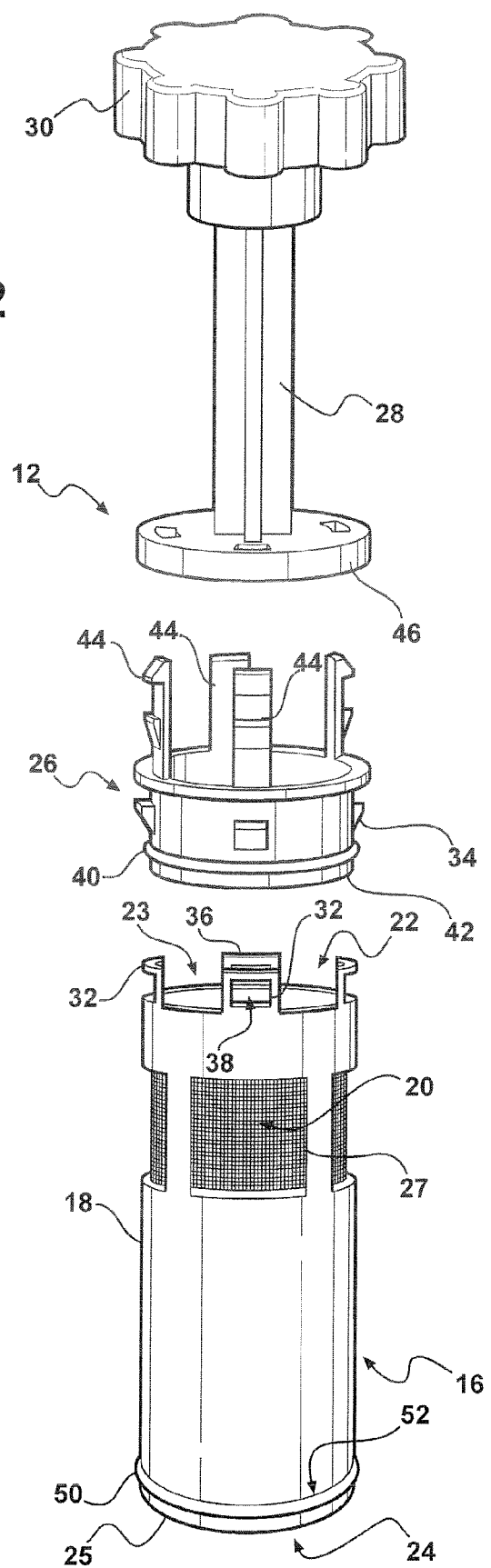

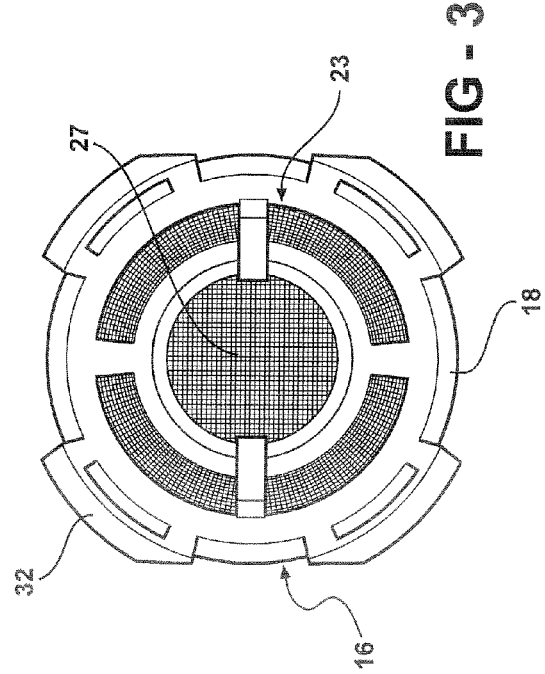
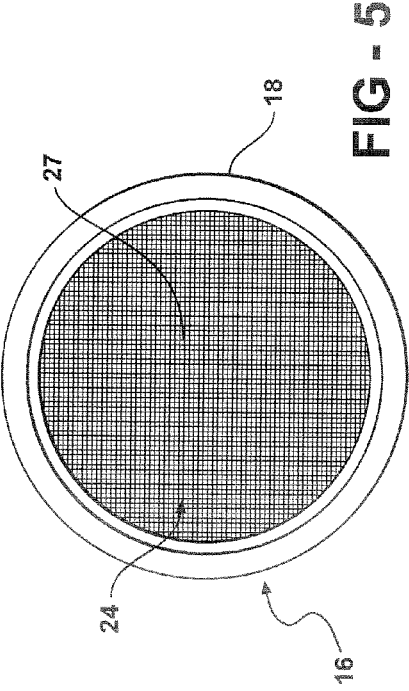
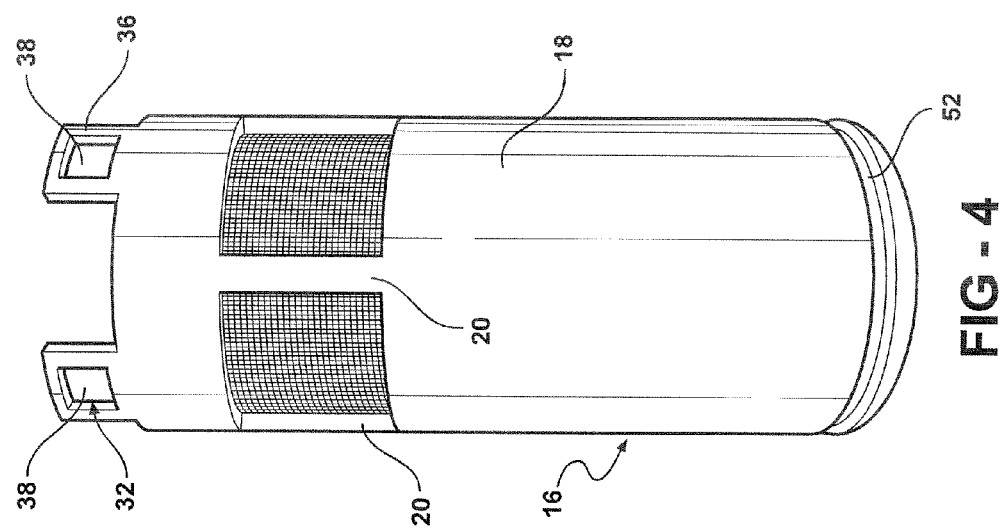

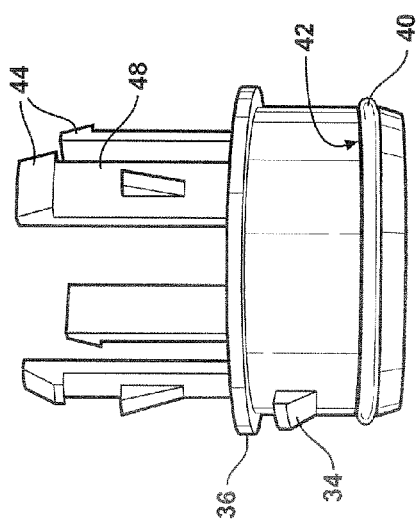
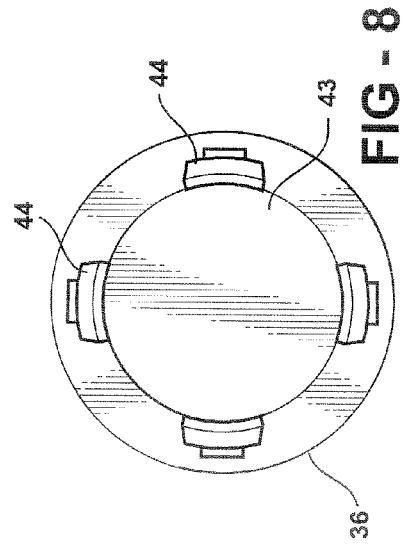
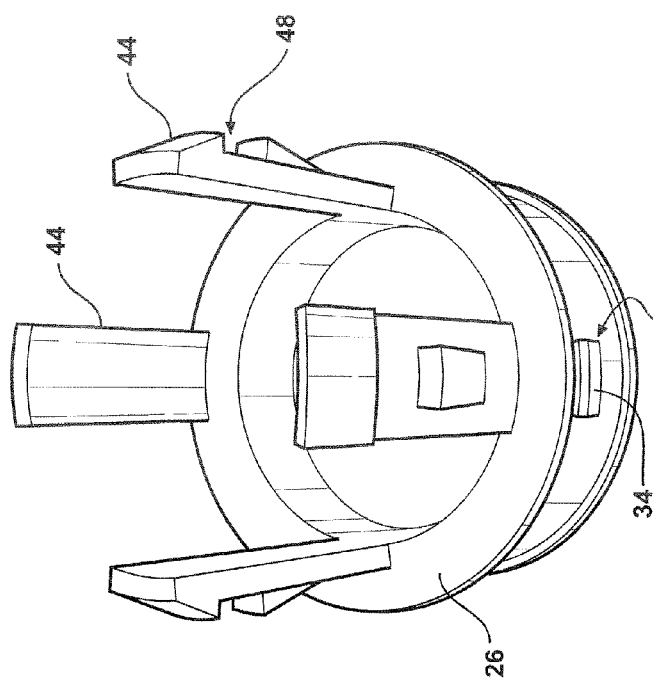

ION EXCHANGE CARTRIDGE FOR FUEL CELL APPLICATIONS

FIELD OF THE INVENTION

The present disclosure relates to a fuel cell system and, more particularly, to an ion exchange cartridge for the fuel cell system.

BACKGROUND OF THE INVENTION

A fuel cell has been proposed as a clean, efficient and environmentally responsible energy source for electric vehicles and various other applications. In particular, the fuel cell has been identified as a potential alternative for the traditional internal-combustion engine used in modern vehicles.

One type of fuel cell is known as a proton exchange membrane (PEM) fuel cell. The PEM fuel cell typically includes three basic components: a cathode, an anode, and an electrolyte membrane. The cathode and the anode typically include a finely divided catalyst, such as platinum, supported on carbon particles and mixed with an ionomer. The electrolyte membrane is sandwiched between the cathode and the anode to form a membrane-electrolyte-assembly (MEA). The MEA is often disposed between porous diffusion media (DM) which facilitate a delivery of gaseous reactants, typically hydrogen and oxygen, for an electrochemical fuel cell reaction. Individual fuel cells can be stacked together in series to form a fuel cell stack. The fuel cell stack is capable of supplying a quantity of electricity sufficient to provide power to a vehicle.

During operation of the fuel cell stack, the fuel cell stack temperature is generally maintained within a desired range for the electrochemical fuel cell reaction. A coolant system having a coolant tank and coolant lines in fluid communication with the fuel cell stack is typically employed for this purpose. Coolant, such as substantially pure water, from a coolant tank is supplied to the fuel cell stack for regulating the temperature thereof. The coolant supplied to the fuel cell stack is typically desired to have a minimal electrical conductivity. If ions are present in the coolant, an electrical conductivity of the coolant increases and a power generation efficiency of the fuel cell stack decreases. To militate against the decrease in the fuel cell stack efficiency, an ion-exchange cartridge for removing ions in the coolant is typically employed in the coolant system.

Known ion exchange cartridges are disposed in-line between the coolant tank and the fuel cell stack. After sufficient usage, the exhausted ion exchange cartridge including a housing, connectors, and resin, must be replaced and properly discarded. Such service on in-line ion exchange cartridges is generally difficult. For example, access to the part of the engine compartment where the ion-exchange cartridge is disposed may be limited. Additionally, the line is necessarily opened to replace the in-line ion exchange cartridge, resulting in a draining of at least some of the coolant. An entry of contaminants from the environment into the coolant system during such service is therefore likely. A subsequent and undesirable clean-up of the coolant system following service is generally also required.

There is a continuing need for an ion exchange cartridge and method for servicing a coolant system having the ion-exchange cartridge that employs reusable parts, minimizes waste, minimizes a loss of the coolant during the service, and minimizes the exposure of the coolant system to contamination from the environment. Desirably, the ion-exchange cartridge also has an integrated housing with closing and sealing functions that facilitates a reusing and a refilling of the ion-exchange cartridge with service.

SUMMARY OF THE INVENTION

In concordance with the instant disclosure, an ion exchange cartridge and method for servicing a coolant system having the ion-exchange cartridge that employs reusable parts, minimizes waste, minimizes a loss of the coolant during the service, minimizes the exposure of the coolant system to contamination from the environment, and has an integrated housing with closing and sealing functions that facilitates a reusing and a refilling of the ion-exchange cartridge with service, is surprisingly discovered.

In one embodiment, an ion exchange cartridge for a coolant system of a fuel cell stack includes a housing adapted to contain an ion exchange resin therein. The housing has an inlet and at least one fluid-permeable outlet window configured for coolant to flow therethrough. The ion exchange cartridge is adapted to be removably disposed in the coolant system.

In a further embodiment, an ion exchange cartridge assembly for a coolant system of a fuel cell stack includes the ion exchange cartridge having the housing with the ion exchange resin disposed. The ion exchange cartridge assembly includes a bracket coupled to the ion exchange cartridge. The bracket is adapted for removal of the ion exchange cartridge from the coolant system.

In another embodiment, a coolant tank assembly (CTA) of a coolant system for a fuel cell stack includes a coolant tank having a coolant inlet and a coolant outlet. The coolant tank having an aperture formed therein. The CTA includes the ion exchange cartridge assembly removably disposed in the coolant tank and in fluid communication with the coolant inlet.

DRAWINGS

The above, as well as other advantages of the present disclosure, will become readily apparent to those skilled in the art from the following detailed description, particularly when considered in the light of the drawings described hereafter.

FIG. 2 is an exploded, side elevational view of the ion exchange cartridge assembly according to the present disclosure;

FIG. 3 is a top plan view of an ion exchange cartridge for the ion exchange cartridge assembly shown in FIG. 2;

FIG. 4 is a side elevational view of an ion exchange cartridge for the ion exchange cartridge assembly shown in FIG. 2;

FIG. 5 is a bottom plan view of an ion exchange cartridge for the ion exchange cartridge assembly shown in FIG. 2;

FIG. 6 is a perspective view of a cartridge clip for the ion exchange cartridge assembly shown in FIG. 2;

FIG. 7 is a side elevational view of a cartridge clip for the ion exchange cartridge assembly shown in FIG. 2;

FIG. 8 is a top plan view of a cartridge clip for the ion exchange cartridge assembly shown in FIG. 2.

DETAILED DESCRIPTION OF THE INVENTION

Figure 1:
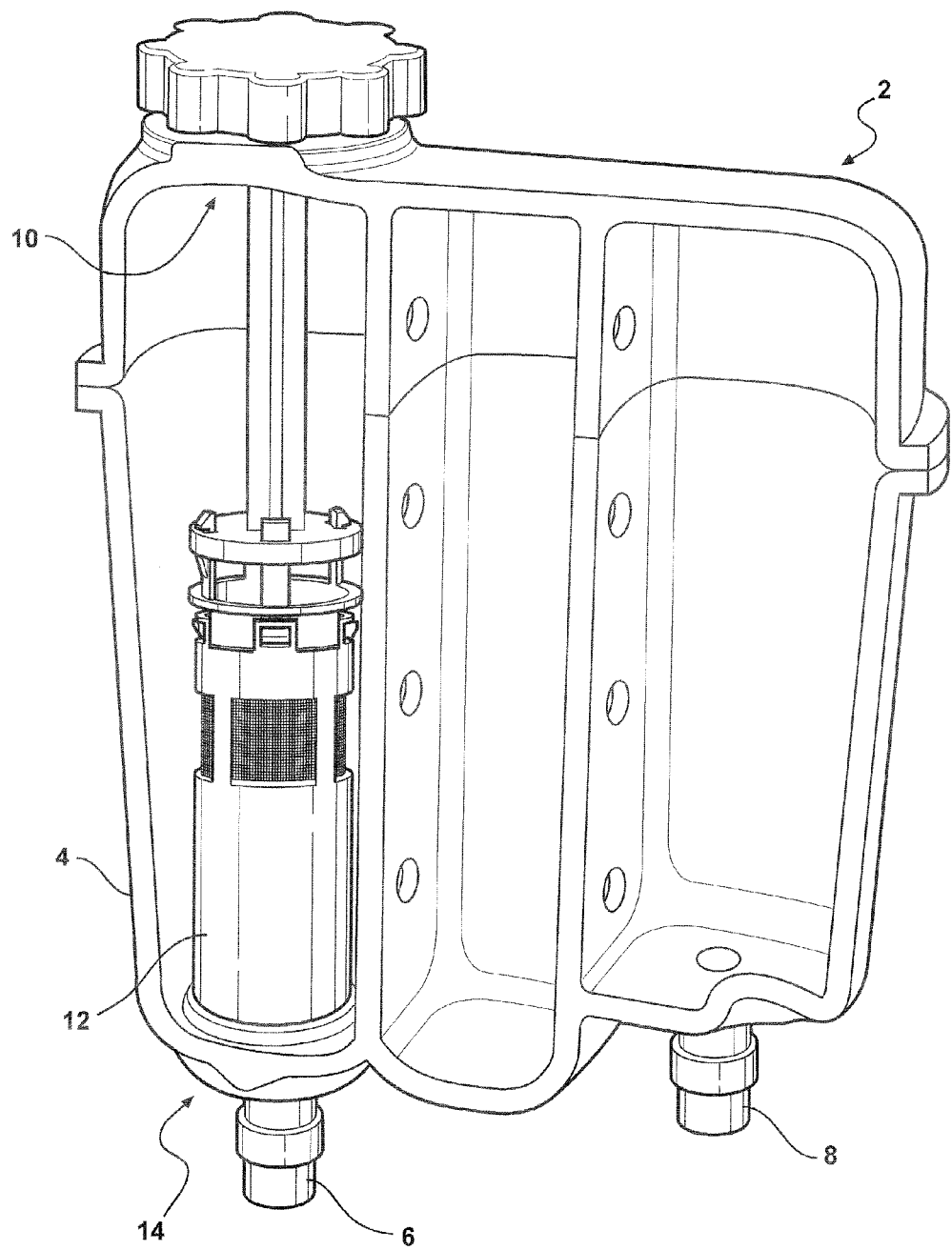
FIG. 1 illustrates a perspective, cross-sectional view of a coolant system for a fuel cell stack, the coolant system including an ion exchange cartridge assembly according to the present disclosure.

The following description is merely exemplary in nature and is not intended to limit the present disclosure, application, or uses. It should also be understood that throughout the drawings, corresponding reference numerals indicate like or corresponding parts and features. In respect of the methods disclosed, the steps presented are exemplary in nature, and thus, are not necessary or critical.

FIG. 1 shows a coolant system having a coolant tank assembly 2 (CTA) according to the present disclosure. The CTA 2 includes a coolant tank 4 having a coolant inlet 6 and a coolant outlet 8. The coolant inlet 6 and the coolant outlet 8 are in fluid communication with a fuel cell stack (not shown), for example, via a coolant circuit. The coolant tank 4 is adapted to receive coolant that has been circulated through the fuel cell stack and store the coolant prior to a recirculation thereof. The coolant tank 4 shown is a multi-chambered coolant reservoir. A skilled artisan should appreciate that other configurations of the coolant tank 4, for example, a single chambered coolant tank 4, may be employed as desired. A plurality of coolant inlets 6, disposed at either end of the coolant tank 4, and a plurality of coolant outlets 8, typically disposed at a bottom end of the coolant tank 4, may also be employed.

The coolant tank 4 has an aperture 10 formed therein. An ion exchange cartridge assembly 12 is inserted through the aperture 10 and seated at a bottom 14 of the coolant tank 4 adjacent the coolant inlet 6. The ion exchange cartridge assembly 12 is in fluid communication with the coolant inlet 6 and adapted for coolant to flow therethrough. The coolant flows through the ion exchange cartridge assembly 12 for removal of undesirable ions from the coolant prior to the coolant entering the coolant tank 4, and subsequently the fuel cell stack.

With reference to FIGS. 1 and 2, the ion exchange cartridge assembly 12 includes an ion exchange cartridge 16 with a housing 18. The housing 18 is adapted for an ion exchange resin to be disposed therein. The ion exchange resin may be a substantially water-insoluble material provided in the form of beads, for example. In one embodiment, the ion exchange resin is fabricated from an organic polymer substrate. As nonlimiting examples, the ion exchange resin may include at least one of a strongly acidic polymer, for example, having sulfonic acid groups, a strongly basic polymer, for example, having trimethylammonium groups, a weakly acidic polymer, for example, having carboxylic acid groups, and a weakly basic polymer, for example, having amino groups. As further nonlimiting examples, the ion exchange resin may include at least one of sodium polystyrene sulfonate (polyAMPS), poly(acrylamido-N-propyltrimethylammonium chloride) (polyAPTAC), and polyethylene amine. A skilled artisan should appreciate that other suitable ion exchange resins may be used as desired.

The ion exchange cartridge 16 has at least one fluid-permeable outlet window 20 formed in the housing 18. In a particular embodiment, the ion exchange cartridge 16 has a plurality of outlet windows 20 arranged around the housing 18. The outlet window 20 is configured for the coolant to flow therethrough from the coolant inlet 6, through the ion exchange resin, and into the coolant tank 4. A volume of the coolant flow through the ion exchange cartridge 16 may range from about 1 liter per minute to about 5 liters per minute, for example. In a particular embodiment, the volume of coolant flow through the ion exchange cartridge 16 is from about 2 liters per minute to about 4 liters per minute. A suitable coolant flow for the coolant system of the fuel cell stack may be selected as desired. A size of the ion exchange cartridge 16 may also be appropriately selected to accommodate a desired flow rate and to minimize pressure drop across the ion exchange cartridge 16.

The housing 18 of the ion exchange cartridge 16 has a first end 22 with a first opening 23 formed therein. The housing 18 has a second end 24 with an inlet 25 formed therein. The inlet 25 is adapted for fluid communication with the coolant inlet 6 of the coolant tank 4. The inlet 25 facilitates the flow of the coolant into the ion exchange cartridge 16 for removal of undesirable ions.

The ion exchange cartridge 16 includes a closure head 26 removably coupled to the housing 14 and adapted to seal the first opening 23. The closure head 26 may have dimensions that allow the closure head 26 to be at least partially inserted into the first opening 23 of the housing 14.

At least one of the housing inlet 25 and outlet window 20 may have a porous cover 27, such as a mesh, disposed thereover. Suitable porous covers 27 may be selected as desired. For example, the porous cover 27 may be integrally molded with the housing 18. The porous cover 27 may be overmolded to the housing 18. In another embodiment, the porous cover 27 may be at least one of glued and welded, for example, to the housing 18 over the housing inlet 25 and the outlet window 20. The porous cover 27 is adapted to keep the ion exchange resins within the housing 18 while the ion exchange cartridge 16 is disposed within the coolant tank 4, and particularly while the coolant flows therethrough.

The housing 18 is adapted to be removably disposed in the coolant tank 4. For example, the housing 18 may be a substantially cylindrical barrel that is inserted through the aperture 10 of the coolant tank 4. In one embodiment, the ion exchange cartridge assembly 12 further includes a bracket 28 coupled to the ion exchange cartridge 16. For example, the bracket 28 may be adapted to be coupled with the closure head 26. The bracket 28 thereby enables a removal of the ion exchange cartridge 16 from the coolant tank 4 as desired. The bracket 28 may also have a length that allows the ion exchange cartridge 16 to be seated at a base of the coolant tank 4 when installed in the CTA 2.

A cap 30 is coupled to the bracket 28 at an end of the bracket 28 opposite the ion exchange cartridge 16. The cap 30 may be at least one of snap-on and threaded as desired. Other suitable types of caps 30 may also be employed. In a particular embodiment, the aperture 10 of the coolant tank 4 may be circumscribed by an outwardly extending, threaded lip (not shown). The threaded lip of the coolant tank 4 may cooperate with the threaded cap 30 to seal the aperture 10 of the coolant tank 4 during an operation of the ion exchange cartridge assembly 12. For example, the cap 30 may include a flat sealing O-ring (not shown) for sealing the aperture 10 of the coolant tank 4 into which the ion exchange cartridge 16 is inserted.

The ion exchange cartridge assembly 12, and in particular the ion exchange cartridge 16, may be cost-effectively produced, for example, by an injection molding process as is known in the art. Other suitable processes for producing and assembling the ion exchange cartridge assembly 12 and the ion exchange cartridge 16 may be employed as desired.

Referring now to FIGS. 2 to 8, various embodiments of the ion exchange cartridge assembly 12 of the disclosure are described in further detail. The housing 18 of the ion exchange cartridge 16 is adapted to couple with the closure head 26. As a nonlimiting example, the first end 22 of the housing 18 has at least one female clip feature 32 that cooperates with at least one male clip feature 34 formed on the closure head 26. The female clip feature 32 may include, for example, an outwardly extending portion 36 having a clip opening 38 formed therein for receiving the male clip feature 34. A skilled artisan should understand that the at least one female clip feature 32 may alternatively be formed on the closure head 26 and the at least one male clip feature may alternatively be formed on the housing 18, as desired.

In a further embodiment, a first sealing member 40, such as a first O-ring, is disposed between the closure head 26 and the first opening 23 of the housing 18. It should be appreciated that a skilled artisan may select other suitable sealing members for use as the first sealing member 40. The first sealing member 40 provides a sealing engagement between the closure head 26 and the housing 18 when the closure head 26 and the housing are 18 assembled to form the ion exchange cartridge 16. The first sealing member 40 facilitates an opening of the ion exchange cartridge 16 when removed from the coolant tank 4 for replacement of exhausted ion exchange resin.

In a particular embodiment, the first sealing member 40 may be disposed in a first circumferential groove 42 formed in one of the housing 18 and the closure head 26. It should be appreciated that the first sealing member 40 may be disposed on a surface of the closure head 26 and sandwiched between the surface and an inner wall of the housing 18 when the ion exchange cartridge 16 is assembled. A separating wall 43 of the closure head 26 and the first sealing member 40 of the closure head 26 militates against a flowing of the coolant through the first opening 23 of the housing 18. The wall 43 and the first sealing member 40 also militate against any expelling of the ion exchange resin from the housing 18 due to pressure from the coolant flow.

The closure head 26 may also have at least one male bayonet fitting 44. The male bayonet fitting 44 is adapted to couple with a female bayonet fitting 46 on the bracket 28. The male bayonet fitting 44 may include a channel 48 that cooperates and the female bayonet fitting 46. As a nonlimiting example, the male bayonet fitting 44 may include a plurality of outwardly extending clip features and the female bayonet fitting 46 may include a ring feature adapted to fit tightly over the clip features. One of ordinary skill in the art should appreciate that the male bayonet fitting 44 may alternatively be formed on the bracket 28 and that the female bayonet fitting 46 may alternatively be formed on the closure head 26, if desired. Other suitable means for coupling the closure head 26 with the bracket 28 for removably disposing the ion exchange cartridge 16 within the coolant tank 4 may also be employed. For example, at least one of the closure head 26, the bracket 28, and the cap 30 may be integrally formed as a single part.

In an additional embodiment, the second end 24 of the housing 18 has a second sealing member 50, such as a second O-ring. The second sealing member 50 may circumscribe the second end 24 of the housing 18. The second sealing member 50 is adapted to sealingly seat within the coolant tank 4 in fluid communication with the coolant inlet 6. For example, the second sealing member 50 may be disposed between the housing 18 and a seating feature (not shown) formed in a base of the coolant tank 4 in line with the coolant inlet 6. The second sealing member 50 may thereby militate against the coolant flow bypassing the ion exchange cartridge 16 and directly entering the coolant tank 4. As with the first sealing member 40, the second sealing member 50 may be selected as desired. The second sealing member 50 may be disposed within a second circumferential groove 52 formed in the housing 18 at the second end 24 thereof.

Figure 9:
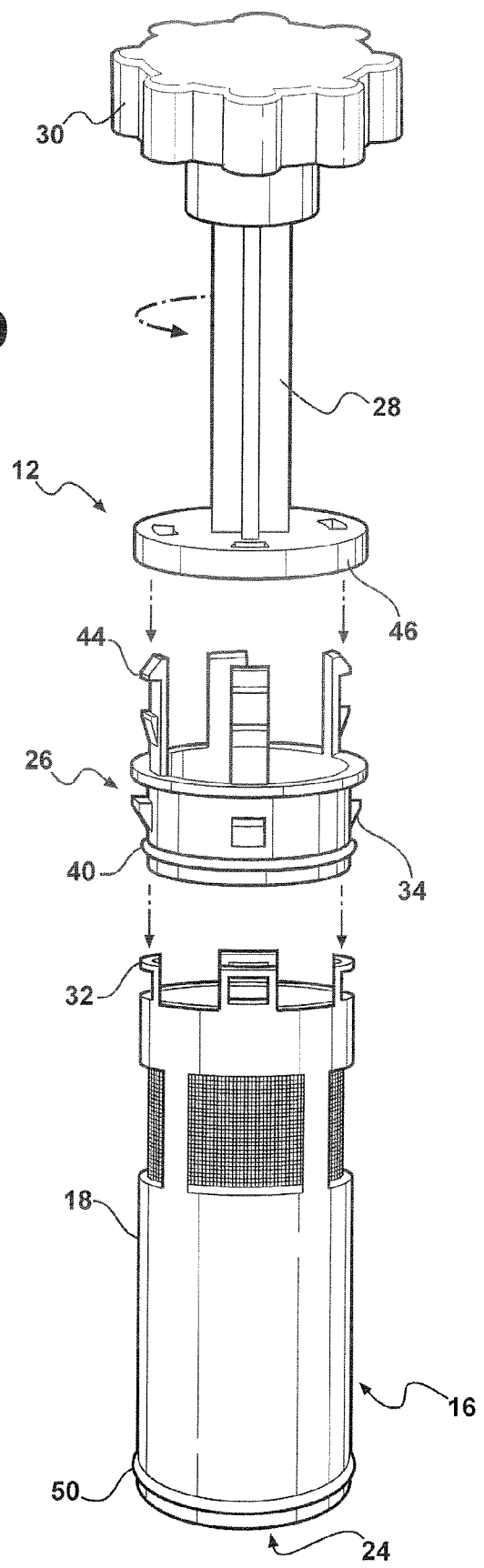
FIG. 9 is an exploded, side elevational view of the ion exchange cartridge assembly according to the present disclosure, showing a method for assembling the ion exchange cartridge assembly.

Referring now to FIG. 9, a method of assembling the ion exchange cartridge assembly 12 of the present disclosure is provided. The method includes first providing the housing 18 with the second sealing member 50, the closure head 26 with the first sealing member 40, and the bracket 28. The housing 18 is then filled with a suitable ion exchange resin. The closure head 26 is coupled to the housing 18, for example, by inserting the closure head into the housing 14 until the male clip features 34 of the closure head 26 cooperate with the female clip features 32 of the housing 18 to militate against relative movement therebetween. Similarly, the method includes coupling the bracket 28 with the closure head 26, for example, by inserting the male bayonet features 44 of the closure head 26 into the female bayonet fitting 46 of the bracket 28 until the channels 48 of the male bayonet fitting 44 cooperate with the female bayonet fitting 46 to militate against relative movement therebetween. The ion exchange cartridge assembly 12 is thereby assembled and prepared for installation in the coolant tank 4.

The ion exchange cartridge assembly 12 is installed in the coolant tank 4 by inserting the ion exchange cartridge assembly 12 through the aperture 10. The second end 24 of the ion exchange cartridge 16 is sealingly seated at the base of the coolant tank 4 in fluid communication with the coolant inlet 6 of the coolant tank 4. The coolant tank 4 is then sealed with the cap 30, for example, by twisting the cap 30 if threaded. It should be appreciated that the bracket 28 does not turn with the twisting of the cap 30. Following a period of use, the ion exchange cartridge 16 may be removed form the coolant tank 4 by unsealing the cap 30 and pulling on the bracket 28 to unseat and remove the ion exchange cartridge 16. The ion exchange cartridge assembly 12 may then be partially or completely disassembled and the exhausted ion exchange cartridge 16 recharged with new ion exchange resin. Alternatively, the exhausted ion exchange cartridge 16 may be replaced with a recharged ion exchange cartridge 16 having the new resin.

A skilled artisan should appreciate that the ion exchange cartridge assembly 16 has an optimized and robust size. The CTA 2 and the ion exchange cartridge assembly 16 of the present disclosure facilitate an ease in service and replacement of exhausted ion exchange resin, for example, at a supplier refilling station. In particular, it is surprisingly found that the clips 32, 34 and the bayonets 44, 46 of the present disclosure allow the ion exchange cartridge 16 to be removed and disassembled multiple times without employing specialized tooling to replace the ion exchange resin inside the ion exchange cartridge 16.

Additionally, a loss of coolant upon service is minimized as the ion exchange cartridge 16 may simply be removed from the coolant tank 4 without breaking a coolant line, as is the practice with conventional, in-line ion exchange systems. Unlike conventional in-line systems, the ion exchange cartridge 16 may be recharged and recycled instead of being disposed of following removal. Similarly, exposure of the coolant to contamination, for example, through environmental contact is minimized with the CTA 2 and the ion exchange cartridge assembly 16 of the disclosure.

The position of the at least one window 20 in the ion exchange cartridge 16 may be selected so that the at least one window 20 is in substantially continuous contact with the coolant within the coolant tank 4. It should therefore be understood that a contact between the ion exchange resin inside the ion exchange cartridge 16 with the coolant fluid inside the coolant tank 4 advantageously cleans the coolant regardless of whether the coolant is flowing through the ion-exchange cartridge 16. Thus, the ion exchange cartridge 16 of the present disclosure may also clean the coolant during a shut-down mode of the coolant system.

While certain representative embodiments and details have been shown for purposes of illustrating the invention, it will be apparent to those skilled in the art that various changes may be made without departing from the scope of the disclosure, which is further described in the following appended claims.

What is claimed is:

1. An ion exchange cartridge for a coolant system, comprising:
    a housing adapted to contain an ion exchange resin therein, the housing having a first end with a first opening formed therein, a second end with an inlet formed therein, and at least one fluid-permeable outlet window formed in the housing between the first end and the second end; and
    a closure head removably disposed in the first opening of the housing, the closure head at least partly inserted into the first opening to seal the first end of the housing, wherein the housing is configured for coolant to flow into the housing through the inlet and out of the housing through the at least one fluid-permeable outlet window, and the housing is adapted to be removably disposed in the coolant system, the closure head adapted to be coupled with a bracket for removing the ion exchange cartridge from the coolant system.

2. The ion exchange cartridge of claim 1, wherein the housing is adapted to be removably disposed in a coolant tank of the coolant system.

3. The ion exchange cartridge of claim 1, further comprising a first sealing member disposed between the closure head and the housing, the first sealing member providing a sealing engagement between the housing and the closure head.

4. The ion exchange cartridge of claim 1, wherein the closure head has a male bayonet fitting adapted to couple with a female bayonet fitting on the bracket for removing the ion exchange cartridge from the coolant system.

5. The ion exchange cartridge of claim 1, the first end of the housing having at least one female clip feature cooperating with at least one male clip feature formed on the closure head for coupling the housing to the closure head.

6. The ion exchange cartridge of claim 3, the second end having a circumferential groove.

7. The ion exchange cartridge of claim 6, further comprising a second sealing member disposed in the circumferential groove.

8. The ion exchange cartridge of claim 1, wherein at least one of the housing inlet and the fluid-permeable outlet window includes a mesh.

9. The ion exchange cartridge of claim 1, wherein the housing is a substantially cylindrical barrel.

10. An ion exchange cartridge assembly for a coolant system of a fuel cell stack, comprising:
    an ion exchange cartridge including a housing with an ion exchange resin disposed therein and a closure head, the housing having a first end with a first opening formed therein for removably receiving the closure head, a second end with an inlet formed therein, and at least one fluid-permeable outlet window formed in the housing between the first end and the second end, the closure head at least partly inserted into the first opening to seal the first end of the housing, wherein the housing is configured for coolant to flow into the housing through the inlet and out of the housing through the at least one fluid-permeable outlet window, and the housing is adapted to be removably disposed in the coolant system; and
    a bracket removably coupled to the closure head of the ion exchange cartridge, the bracket adapted for removal of the ion exchange cartridge from the coolant system.

11. The ion exchange cartridge assembly of claim 10, wherein the bracket includes a female bayonet fitting and the closure head includes a male bayonet fitting, the female bayonet fitting and the male bayonet fitting cooperating to couple the bracket to the ion exchange cartridge.

12. The ion exchange cartridge assembly of claim 10, further including a cap coupled to the bracket.

13. The ion exchange cartridge assembly of claim 12, wherein the cap is threaded and includes a flat sealing O-ring for sealing an aperture of the coolant system through which the ion exchange cartridge is inserted.

14. A coolant tank assembly (CTA) of a coolant system for a fuel cell stack, comprising:
    a coolant tank having a coolant inlet and a coolant outlet, the coolant tank having an aperture formed therein; and
    an ion exchange cartridge assembly removably disposed in the coolant tank and in fluid communication with the coolant inlet, the ion exchange cartridge assembly including an ion exchange cartridge having a housing with an ion exchange resin disposed therein and a closure head, the housing having a first end with a first opening formed therein for removably receiving the closure head, a second end with an inlet formed therein, and at least one fluid-permeable outlet window formed in the housing between the first end and the second end, the closure head at least partly inserted into the first opening to seal the first end of the housing, wherein the housing is configured for coolant to flow into the housing through the inlet and out of the housing through the at least one fluid-permeable outlet window.

15. The coolant tank assembly (CTA) of claim 14, wherein the ion exchange cartridge assembly further includes a bracket coupled to the ion exchange cartridge, the bracket having a threaded cap coupled to the bracket at an end opposite the ion exchange cartridge.

16. The coolant tank assembly (CTA) of claim 15, wherein the coolant tank has an outwardly extending threaded lip that cooperates with the threaded cap of the bracket to seal the aperture of the coolant tank when the ion exchange cartridge is inserted for operation.

17. The coolant tank assembly (CTA) of claim 14, wherein the housing inlet of the ion exchange cartridge assembly is sealingly seated within the coolant tank in fluid communication with the coolant inlet thereof, wherein coolant flows through the housing inlet of the ion exchange cartridge assembly, through the ion exchange resin, and out of the fluid-permeable outlet windows and into the coolant reservoir.

\* \* \* \* \*